United States Patent
Jin (10) Patent No.: US 9,332,410 B2
(45) Date of Patent: May 3, 2016

(54) METHOD, APPARATUS, AND TERMINAL FOR ANSWERING CALL

(71) Applicant: Huawei Device Co., Ltd., Shenzhen (CN)

(72) Inventor: Hui Jin, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/573,810

(22) Filed: Dec. 17, 2014

(65) Prior Publication Data

US 2015/0105055 A1 Apr. 16, 2015

Related U.S. Application Data

(63) Continuation of application No. PCT/CN2013/081928, filed on Aug. 21, 2013.

(30) Foreign Application Priority Data

Aug. 21, 2012 (CN) .......................... 2012 1 0298881

(51) Int. Cl.
*H04M 3/42* (2006.01)
*H04W 4/16* (2009.01)
*H04W 4/22* (2009.01)
*H04M 1/65* (2006.01)
*H04M 1/663* (2006.01)
*H04W 4/14* (2009.01)
(Continued)

(52) U.S. Cl.
CPC .............. *H04W 4/16* (2013.01); *H04M 1/6505* (2013.01); *H04M 1/663* (2013.01); *H04W 4/14* (2013.01); *H04W 4/22* (2013.01); *H04W 76/007* (2013.01); *H04M 1/652* (2013.01); *H04M 2250/74* (2013.01)

(58) Field of Classification Search
CPC .................................. H04H 60/45; H04M 3/12
USPC ................. 455/456.1, 404.2, 417; 379/93.35, 379/88.24, 377, 88.21, 88.18, 210.01, 379/142.06
See application file for complete search history.

(56) References Cited

U.S. PATENT DOCUMENTS

| | | | |
|---|---|---|---|
| 5,559,878 A * | 9/1996 | Keys ....................... | H04M 3/48 379/210.01 |
| 6,018,671 A | 1/2000 | Bremer | |
| 7,715,881 B1 | 5/2010 | Liu et al. | |

(Continued)

FOREIGN PATENT DOCUMENTS

| | | |
|---|---|---|
| CN | 1780328 A | 5/2006 |
| CN | 101014071 A | 8/2007 |

(Continued)

*Primary Examiner* — Kiet Doan
(74) *Attorney, Agent, or Firm* — Slater & Matsil, L.L.P.

(57) ABSTRACT

The present invention discloses a method, an apparatus, and a terminal for answering a call and relates to the field of terminal technologies. The method includes, after a call is received from a calling party, answering the call by using an automatic call answering function of a terminal, and talking with the calling party. If an instruction is received from an owner in the process of talking with the calling party, an operation is performed according to the instruction of the owner. If no instruction is received from an owner in the process of talking with the calling party, an emergency level of the call according to call content is determined, and an operation is performed according to the determined emergency level.

13 Claims, 6 Drawing Sheets

(51) Int. Cl.
*H04W 76/00* (2009.01)
*H04M 1/652* (2006.01)

(56) References Cited

U.S. PATENT DOCUMENTS

| | | | | |
|---|---|---|---|---|
| 8,041,014 B1 * | 10/2011 | Daily | ............ | H04M 1/64 379/207.15 |
| 2001/0031633 A1 * | 10/2001 | Tuomela | ............ | H04M 1/663 455/417 |
| 2001/0036252 A1 | 11/2001 | Renner et al. | | |
| 2009/0150150 A1 | 6/2009 | Yang | | |
| 2011/0069825 A1 | 3/2011 | Rogson | | |

FOREIGN PATENT DOCUMENTS

| | | |
|---|---|---|
| CN | 101193378 A | 6/2008 |
| CN | 101452507 A | 6/2009 |
| CN | 101588407 A | 11/2009 |
| CN | 102082882 A | 6/2011 |
| CN | 102510426 A | 6/2012 |
| CN | 102611793 A | 7/2012 |
| CN | 102857634 A | 1/2013 |
| JP | 2007049525 A | 2/2007 |
| WO | 2007035222 A1 | 3/2007 |
| WO | 2008144654 A1 | 11/2008 |

* cited by examiner

METHOD, APPARATUS, AND TERMINAL FOR ANSWERING CALL

This application is a continuation of International Application No. PCT/CN2013/081928, filed on Aug. 21, 2013, which claims priority to Chinese Patent Application No. 201210298881.0, filed on Aug. 21, 2012, both of which are incorporated herein by reference in their entireties.

TECHNICAL FIELD

The present invention relates to the field of terminal technologies, and in particular, to a method, an apparatus, and a terminal for answering a call.

BACKGROUND

With constant development of terminal technologies, function types of a terminal are increasingly diversified, and answering a call is an essential function of each terminal. In a case where a user cannot answer a call or it is inconvenient for a user to answer a call, it is necessary to improve a manner of a terminal answering a call, so as to meet a calling requirement of the user.

In the prior art, when answering a call, a user pre-sets an automatic call answering rule in a mobile phone, where the automatic call answering rule is mainly as follows. Filtering is performed according to a phone number of a call, the call is pre-transferred to a specific mobile phone or is sent to a voice mailbox, the call is answered automatically and a recording is played, or the call is rejected and an SMS message is returned.

During an implementation of the present invention, the inventor finds that the prior art has at least the following problems.

In a call answering manner in the prior art, a user needs to pre-set a mobile phone to an automatic answering mode, which is not suitable in a case where the user temporarily forgets taking the mobile phone. For the automatic answering manner or the call rejection manner, an operation is performed simply according to a phone number of a call, and an importance or emergency level of the call cannot be determined, so that an important call may be missed. For a case that a call is transferred to a voice mailbox, the user needs to subscribe to a related service of an operator and afford a monthly charge. In addition, the user needs to actively call a voice mailbox center, and then the user can listen to a left message. Therefore, not only is inconvenience caused to the user, but also additional fees of the user are wasted.

SUMMARY

In view of this, embodiments of the present invention provide a method, an apparatus, and a terminal for answering a call. The technical solutions are as follows.

According to one aspect, a method for answering a call is provided. The method includes, after a call is received from a calling party, answering the call by using an automatic call answering function of a terminal, and talking with the calling party. If an instruction is received from an owner in the process of talking with the calling party, an operation according to the instruction of the owner is performed. If no instruction is received from an owner in the process of talking with the calling party, an emergency level of the call is determined according to call content, and an operation is performed according to the determined emergency level.

Optionally, before the answering the call by using an automatic call answering function of a terminal, the method further includes receiving information, determining whether the received information includes preset information for enabling the automatic call answering function or detecting whether the received information includes an instruction for enabling the automatic call answering function. If yes, the automatic call answering function of the terminal is enabled. The method further includes determining whether a call of a preset number used to trigger enabling of the automatic call answering function is received and whether the call exceeds preset duration. If yes, the automatic call answering function of the terminal is enabled.

Optionally, after the answering the call by using an automatic call answering function of a terminal, the method further includes determining, in the process of talking with the calling party, whether a parameter setting instruction sent by the owner is received. If yes, the performing an operation according to the instruction of the owner specifically includes setting a parameter of the automatic call answering function according to the parameter setting instruction sent by the owner, where the parameter for setting the automatic call answering function includes a parameter for setting a filtering manner, a parameter for setting modes of an earpiece and a headset during the answering, a parameter for setting whether to notify the owner, or a parameter for setting whether to play a recording for the owner.

Optionally, after the answering the call by using an automatic call answering function of a terminal, the method further includes determining, in the process of talking with the calling party, whether a call answering instruction sent by the owner is received. If yes, the performing an operation according to the instruction of the owner specifically includes quitting talking with the calling party according to the call answering instruction sent by the owner, and talking, by the owner, with the calling party.

The performing an operation according to the determined emergency level specifically includes, if the determined emergency level is urgency, establishing a connection with the owner, or if the determined emergency level is non-urgency, excerpting a call keyword, and determining, according to a setting, whether to notify the owner. If yes, the owner is notified according to a set notification manner.

Optionally, the notifying the owner according to a set notification manner specifically includes, if a current mode is a phone forgetting mode, notifying the owner by using a manner of sending an SMS message to the owner, sending a mail to the owner, calling the owner, or sending an instant messaging IM message to the owner. Or, if a current mode is a conference mode, the owner is notified by using a manner of vibration, lighting, or screen lighting.

According to another aspect, an apparatus for answering a call is provided. The apparatus includes a calling module, configured to, after a call is received from a calling party, answer the call by using an automatic call answering function of a terminal, and talk with the calling party. The apparatus includes a first processing module, configured to, if an instruction is received from an owner in the process of talking performed by the calling module with the calling party, perform an operation according to the instruction of the owner. The apparatus further includes a second processing module, configured to, if no instruction is received from an owner in the process of talking performed by the calling module with the calling party, determine an emergency level of the call according to call content, and perform an operation according to the determined emergency level.

Optionally, the apparatus further includes an enabling module, configured to receive information, determine whether the received information includes preset information for enabling the automatic call answering function or detect whether the received information includes an instruction for enabling the automatic call answering function. If yes, the automatic call answering function of the terminal is enabled. The enabling module is configured to determine whether a call of a preset number used to trigger enabling of the automatic call answering function is received and whether the call exceeds preset duration. If yes, the automatic call answering function of the terminal is enabled.

Optionally, the apparatus further includes a first determining module, configured to determine, in the process of talking performed by the calling module with the calling party, whether a parameter setting instruction sent by the owner is received, where the first processing module is specifically configured to, if the first determining module determines that the parameter setting instruction sent by the owner is received, set a parameter of the automatic call answering function according to the parameter setting instruction sent by the owner, where the parameter for setting the automatic call answering function includes a parameter for setting a filtering manner, a parameter for setting modes of an earpiece and a headset during the answering, a parameter for setting whether to notify the owner, or a parameter for setting whether to play a recording for the owner.

Optionally, the apparatus further includes a second determining module, configured to determine, in the process of talking performed by the calling module with the calling party, whether a call answering instruction sent by the owner is received, where the first processing module is specifically configured to, if the second determining module determines that the call answering instruction sent by the owner is received, quit the talking with the calling party according to the call answering instruction sent by the owner, and the owner talks with the calling party.

The second processing module is specifically configured to, if the determined emergency level is urgency, establish a connection with the owner, or if the determined emergency level is non-urgency, excerpt a call keyword, and determine, according to a setting, whether to notify the owner. If yes, the owner is notified according to a set notification manner.

Optionally, the second processing module is specifically configured to, if a current mode is a phone forgetting mode, notify the owner by using a manner of sending an SMS message to the owner, sending a mail to the owner, calling the owner, or sending an instant messaging IM message to the owner. If a current mode is a conference mode, the owner is notified by using a manner of vibration, lighting, or screen lighting.

According to still another aspect, a terminal for answering a call is further provided, where the terminal includes the foregoing apparatus for answering a call.

The technical solutions provided in the embodiments of the present invention bring about the following benefits.

A call is answered by using an automatic call answering function of a terminal, and talking with a calling party is performed. If no instruction is received from an owner in the process of talking with the calling party, an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Embodiment 1

Figure 1:
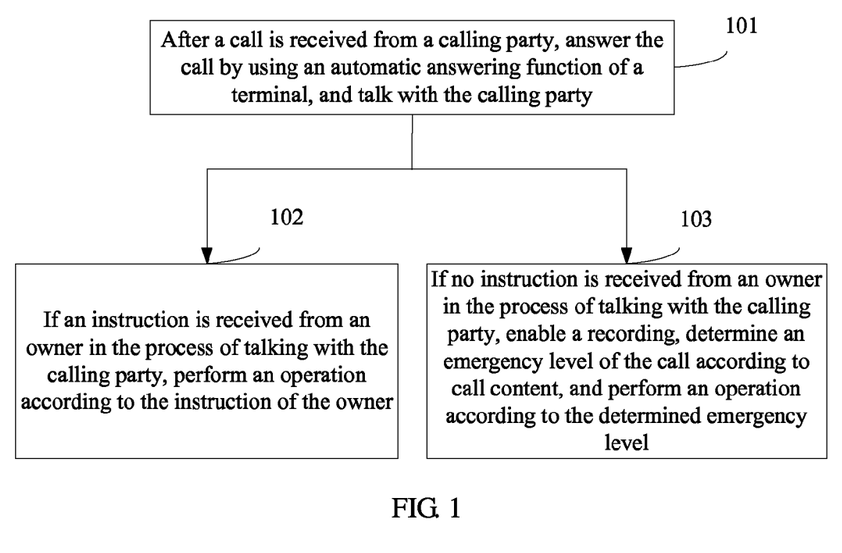
FIG. 1 is a flowchart of a method for answering a call according to Embodiment 1 of the present invention.

For a case that a user cannot receive a call or it is inconvenient for a user to answer a call, this embodiment provides a method for answering a call. As shown in FIG. 1, a procedure of the method provided by this embodiment is specifically as follows.

101. After a call is received from a calling party, answer the call by using an automatic call answering function of a terminal, and talk with the calling party.

Further, after the call is answered by using the automatic call answering function of the terminal, the method further includes receiving information, determining whether the received information includes preset information for enabling the automatic call answering function or detecting whether the received information includes an instruction for enabling the automatic call answering function. If yes, the automatic call answering function of the terminal is enabled. Or the method further includes determining whether a call of a preset number used to trigger enabling of the automatic call answering function is received and whether the call exceeds preset duration. If yes, the automatic call answering function of the terminal is enabled.

102. If an instruction is received from an owner in the process of talking with the calling party, perform an operation according to the instruction of the owner.

Further, after the call is answered by using the automatic call answering function of the terminal, the method further includes determining, in the process of talking with the calling party, whether a parameter setting instruction sent by the owner is received. If yes, the performing an operation according to the instruction of the owner specifically includes but is not limited to setting a parameter of the automatic call answering function according to the parameter setting instruction sent by the owner, where the parameter for setting the automatic call answering function includes a parameter for setting a filtering manner, a parameter for setting modes of an earpiece and a headset during the answering, a parameter for setting whether to notify the owner, or a parameter for setting whether to play a recording for the owner.

Optionally, after the call is answered by using the automatic call answering function of the terminal, the method further includes determining, in the process of talking with the calling party, whether a call answering instruction sent by the owner is received. If yes, the performing an operation according to the instruction of the owner specifically includes but is not limited to quitting talking with the calling party according to the call answering instruction sent by the owner, and talking, by the owner, with the calling party.

103. If no instruction is received from an owner in the process of talking with the calling party, determine an emergency level of the call according to call content, and perform an operation according to the determined emergency level.

The performing an operation according to the determined emergency level specifically includes but is not limited to the following. If the determined emergency level is urgency, a connection with the owner is established. If the determined emergency level is non-urgency, a call keyword is excerpted, and a determination is made, according to a setting, whether to notify the owner. If yes, the owner is notified according to a set notification manner.

Optionally, the notifying the owner according to a set notification manner specifically includes the following. If a current mode is a phone forgetting mode, the owner is notified by using a manner of sending an SMS message to the owner, sending a mail to the owner, calling the owner, or sending an IM (Instant Messaging) message to the owner. If a current mode is a conference mode, the owner is notified by using a manner of vibration, lighting, or screen lighting.

According to the method provided by this embodiment, after a call is answered by using an automatic call answering function of a terminal, talking with a calling party is performed. If no instruction is received from an owner in the process of talking with the calling party, an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

To describe the method for answering a call provided by the foregoing embodiment more clearly, the following describes the method for answering a call with reference to the foregoing content and by using content in Embodiment 2 and Embodiment 3 as examples. For details, reference is made to the following Embodiment 2 and Embodiment 3.

Embodiment 2

Figure 2:
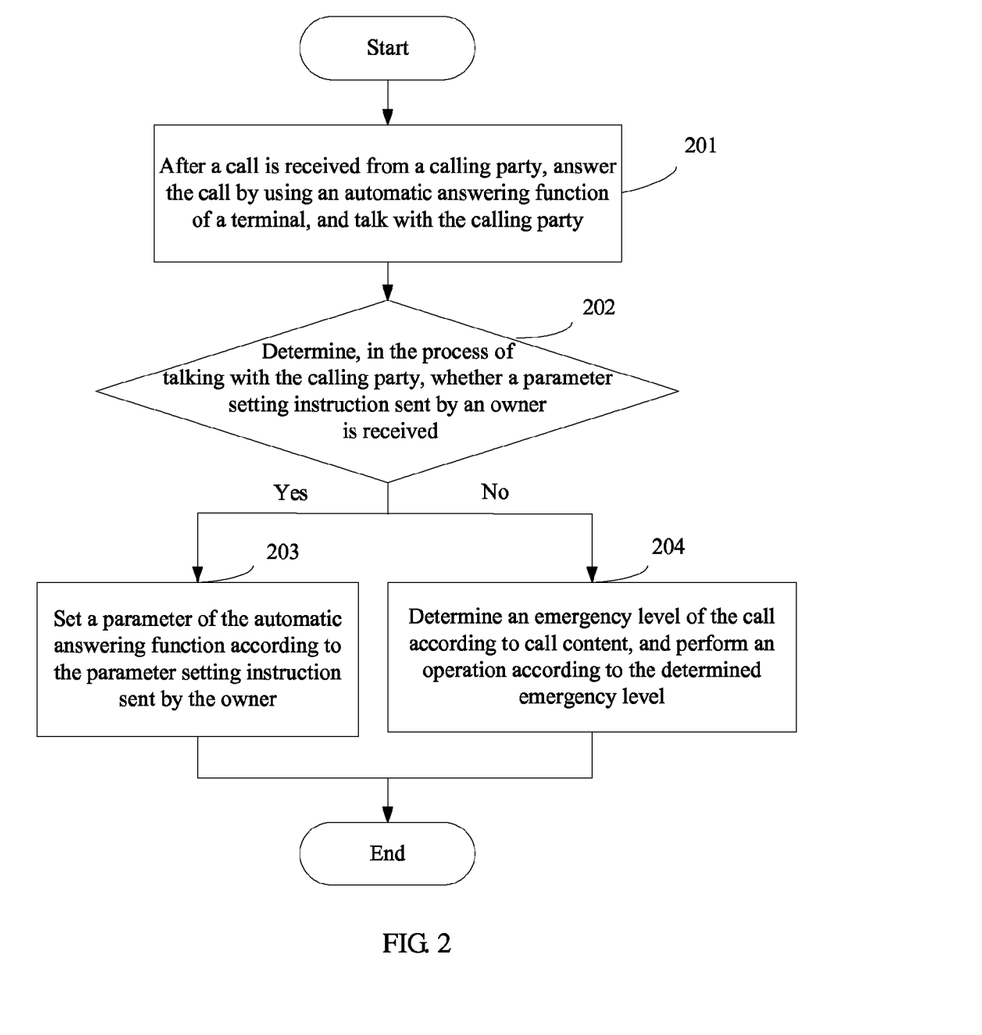
FIG. 2 is a flowchart of a method for answering a call according to Embodiment 2 of the present invention.

This embodiment provides a method for answering a call. For convenience of description, this embodiment describes the method for answering a call by using an example that a terminal for answering a call is a mobile phone in a scenario where a user forgets taking the mobile phone and cannot answer a call. As shown in FIG. 2, a procedure of the method provided by this embodiment is specifically as follows.

201. After a call is received from a calling party, answer the call by using an automatic call answering function of a mobile phone, and talk with the calling party.

For this step, the automatic call answering function of the mobile phone needs to be triggered and enabled in advance, so that the mobile phone answers a call automatically. However, in a scenario where the user forgets taking the mobile phone and cannot answer a call, the user cannot perform an operation on the mobile phone directly. Therefore, the method provided by this embodiment provides a manner of enabling the automatic call answering function of the mobile phone through remote control by the user. During a specific implementation, the manner of enabling the automatic call answering function of the mobile phone through remote control by the user includes but is not limited to the following three types.

Manner 1: Implementing the remote control by sending instruction information.

During a specific implementation, the user of the mobile phone, that is, an owner may send an SMS message to the mobile phone by using another mobile phone, and the SMS message includes an instruction for enabling the automatic call answering function.

For this manner, after receiving the instruction information, the mobile phone detects whether the received information includes an instruction for enabling the automatic call answering function. If yes, the automatic call answering function of the mobile phone is enabled. With respect to a detection manner, a detection program can be installed on the mobile phone side, and the detection program is used to detect the received information content. For example, each time after the mobile phone receives information, it detects, by using the detection program, whether the information includes a preset keyword, so as to confirm whether the received information includes an instruction for enabling the automatic call answering function. This embodiment does not limit a specific preset keyword. Certainly, besides the foregoing detection manner, another detection manner may also be available, which is also not specifically limited by this embodiment.

Manner 2: Implementing the remote control by sending preset information for enabling the automatic call answering function.

During a specific implementation, an owner may contact an operator, and the operator side sends preset information used for enabling the automatic call answering function to the mobile phone, where the preset information may be information in a preset format and is specially used to enable the automatic call answering function. For this manner, after receiving the information, the mobile phone determines whether the received information includes the preset information for enabling the automatic call answering function. If yes, the automatic call answering function of the mobile phone is enabled. A specific format and content of the preset information is not specifically limited by this embodiment.

Manner 3: Implementing the remote control by calling a preset number.

During a specific implementation, an owner may contact an operator, and the operator side calls the mobile phone by using a preset number, so as to enable the automatic call answering function of the mobile phone. For this manner, the mobile phone determines whether a call of a preset number used to trigger enabling of the automatic call answering function is received and whether the call exceeds preset duration. If yes, the automatic call answering function of the mobile phone is enabled. A specific preset number and preset call duration are not specifically limited by this embodiment.

202. Determine, in the process of talking with the calling party, whether a parameter setting instruction sent by an owner is received. If yes, perform step 203; if no, perform step 205.

For this step, in a scenario where the user forgets taking the mobile phone and cannot answer the call, the owner may control, by using call content, the mobile phone in setting a parameter of the automatic call answering function. When it is determined, in the process of talking with the calling party, whether a parameter setting instruction sent by the owner is received, so that the owner can send a remote control instruction to the mobile phone and a security problem caused by random control over the mobile phone by another person except for the owner is avoided, a specific determining manner is not limited by this embodiment. During a specific implementation, in the method provided by this embodiment, in the process of talking with the calling party, it may be determined whether the calling party is the owner. After it is determined that the calling party is the owner, an instruction in the call content is used as the received instruction, and a further operation is performed. When it is determined whether the calling party is the owner, a voice of each person has its own frequency, and there is also an obvious difference in voice frequencies between persons. Therefore, the owner may pre-set the mobile phone, so that the mobile phone can identify a voice frequency of the owner. After answering a call automatically, the mobile phone may determine, according to a voice frequency of the calling party in the process of talking with the calling party, whether the calling party is the owner. Certainly, besides the manner of determining, according to the voice frequency of the calling party, whether the calling party is the owner, another determining manner can be used, which is not specifically limited by this embodiment.

After it is determined that the calling party is the owner, a parameter setting instruction sent by the owner by using the call content may be received. The parameter for setting the automatic call answering function includes but is not limited to a parameter for setting a filtering manner, a parameter for setting modes of an earpiece and a headset during the answering, a parameter for setting whether to notify the owner, and a parameter for setting whether to play a recording for the owner.

The parameter for setting a filtering manner is used to set which call is answered automatically or which call is rejected automatically.

The parameter for setting modes of an earpiece and a headset during the answering is used to set the modes of the earpiece and the headset during the answering, where the modes include but are not limited to a silent mode, a hands-free mode, and the like.

The parameter for setting whether to notify the owner is used to set whether to notify the owner and is further used to set a time and a manner of notifying the owner, where the manner of notifying the owner includes but is not limited to an information notification, an instant messaging message notification, or a call notification.

203. Set a parameter of the automatic call answering function according to the parameter setting instruction sent by the owner and the procedure ends.

Specifically, after it is determined that the parameter setting instruction sent by the owner by using the call content is received in the foregoing step 202, a corresponding parameter of the automatic call answering function can be set according to an instruction included in the parameter setting instruction sent by the owner, and a call answering function is performed subsequently according to the set parameter. For example, if the owner has sent, in the talking process, an instruction for notifying, when a call is answered, the owner by using a call notification manner, the parameter for setting whether to notify the owner can be set to yes, and the notification manner is set to call notification. In this way, in a subsequent step after answering the call ends, call content, information, and the like are notified to the owner by using the call notification manner.

204. Determine an emergency level of the call according to call content, perform an operation according to the determined emergency level, and the procedure ends.

For this step, in a case where the user cannot answer a call, the method provided by this embodiment further supports an operation of enabling a recording. When the emergency level of the call is determined according to the call content, the calling party may be first informed that it is inconvenient for the owner to answer the call, an emergency level is queried, and then the emergency level of the call is determined according to a question and an answer of the calling party. For a definition of the emergency level of the call, two types are classified in this embodiment, one is urgency and the other is non-urgency. For different emergency levels, the method provided by this embodiment provides but is not limited to the following two manners of performing an operation according to the determined emergency level.

First manner: If the determined emergency level is urgency, establishing a connection with the owner.

For example, the call is transferred to a mobile phone pre-set by the owner, or a current phone number of the owner is notified to the calling party, or a contact number of the calling party is notified to the owner. Besides, another manner of establishing a connection may also be used, which is not specifically limited by this embodiment.

Second manner: If the determined emergency level is non-urgency, excerpting a call keyword, and determining, according to a setting, whether to notify the owner. If yes, notifying the owner according to a set notification manner.

If a current mode is a phone forgetting mode, the owner may be notified by using a manner of sending an SMS message to the owner, sending a mail to the owner, calling the owner, or sending an IM message to the owner.

For example, after a recording is saved and a call keyword is excerpted, if the parameter for setting the automatic call answering function is set to notify the owner, the excerpted call keyword may be notified to the owner according to the set notification manner, so that the owner contacts the calling party as soon as possible. Certainly, when it is determined that the emergency level is non-urgency, another processing manner may also be used, which is not specifically limited by this embodiment.

According to the method provided by this embodiment, after a call is answered by using an automatic call answering function of a terminal, talking with a calling party is performed. If no instruction is received from an owner in the process of talking with the calling party, a recording can be enabled, and an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

Embodiment 3

Figure 3:
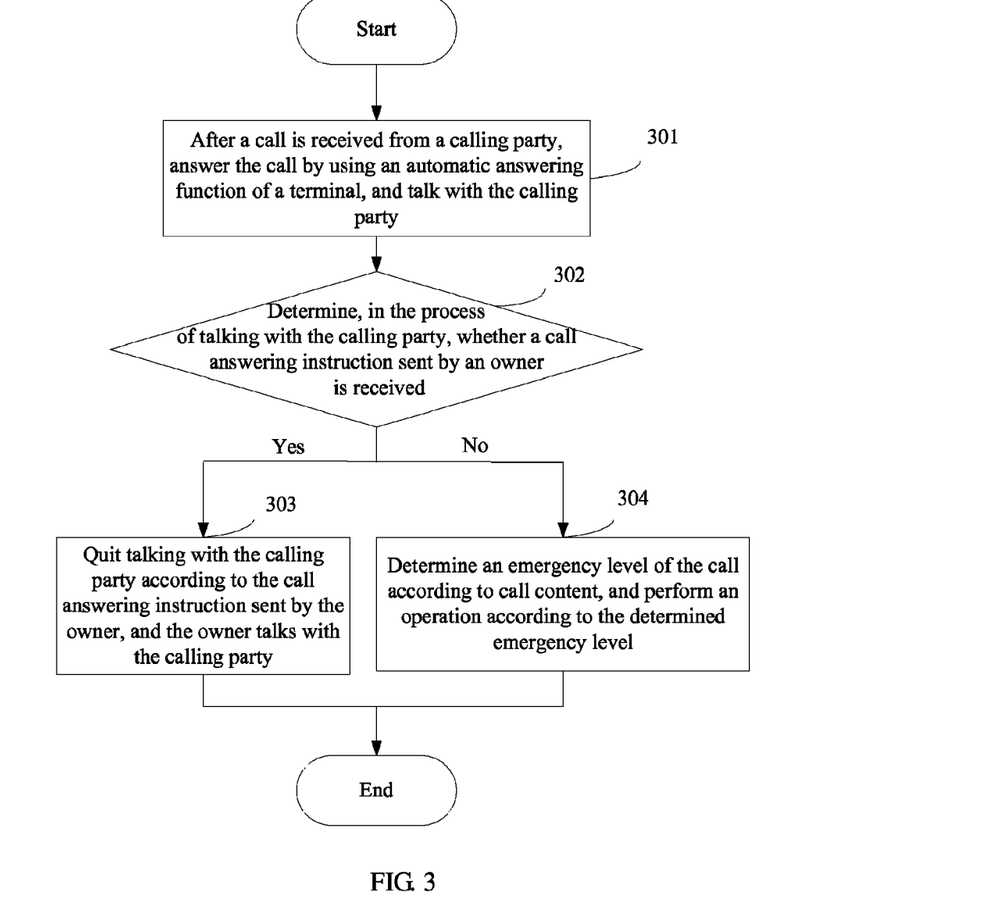
FIG. 3 is a flowchart of a method for answering a call according to Embodiment 3 of the present invention.

This embodiment provides a method for answering a call. With reference to the content of the foregoing Embodiment 1, for convenience of description, this embodiment describes the method for answering a call by using an example that a terminal for answering a call is a mobile phone in a scenario where it is inconvenient for a user to answer a call during driving or a meeting. As shown in FIG. 3, a procedure of the method provided by this embodiment is specifically as follows.

301. After a call is received from a calling party, answer the call by using an automatic call answering function of a mobile phone, and talk with the calling party.

A specific implementation manner of this step is the same as the implementation manner of step 201 in the foregoing Embodiment 2. For details, reference is made to the description of step 201 in the foregoing Embodiment 2, which is not described herein again.

302. Determine, in the process of talking with the calling party, whether a call answering instruction sent by an owner is received. If yes, perform step 303; if no, perform step 304.

For this step, in a scenario where it is inconvenient for a user to answer a call during driving or a meeting, after a hands-free function is enabled, the mobile phone may answer the call automatically. After the mobile phone answers the call automatically, the owner may further send a call answering instruction to the mobile phone to answer the call directly. When it is determined, in the process of talking with the calling party, whether a call answering instruction sent by the owner is received, a specific determining manner is not limited by this embodiment. During a specific implementation, for the method provided by this embodiment, in the process of talking with the calling party, a voice of each person has its own frequency, and there is also an obvious difference in voice frequencies between different persons. Therefore, the owner may pre-set the mobile phone, so that the mobile phone can identify a voice frequency of the owner, and can determine, by detecting the voice of the owner and call content, whether a call answering instruction sent by the owner is received.

303. Quit talking with the calling party according to the call answering instruction sent by the owner, the owner talks with the calling party, and the procedure ends.

Specifically, after it is determined that the call answering instruction sent by the owner is received in the foregoing step 302, the talking with the calling party may be quit, a calling mode is adjusted to a normal calling mode, and the owner talks with the calling party. Therefore, call control is implemented, and it is convenient for the owner to answer the call, but not inconvenient to answer the call.

304. Determine an emergency level of the call according to call content, perform an operation according to the determined emergency level, and the procedure ends.

A specific implementation manner of this step is the same as that described in step 204 in the foregoing Embodiment 2. For details, reference is made to the description of step 204 in the foregoing Embodiment 2, which is not described herein again.

It should be noted that in the method for answering a call provided by this embodiment, in a process of answering a call, a parameter of the call answering function may also be set. A specific process of setting the parameter may be performed on the mobile phone directly by the owner. Besides, the remote setting manner provided by the foregoing Embodiment 2 or another setting manner may also be used, which is not specifically limited by this embodiment. When the determined emergency level is non-urgency, if it is determined according to a setting that the owner needs to be notified, the owner is notified according to a set notification manner. If a current mode is conference mode, the owner may be notified by using a manner of vibration, lighting, or screen lighting. Certainly, besides the foregoing manner, another manner may also be used to notify the owner, and a specific notification manner is not limited by this embodiment.

According to the method provided by this embodiment, after a call is answered by using an automatic call answering function of a terminal, talking with a calling party is performed. If no instruction is received from an owner in the process of talking with the calling party, a recording can be enabled, and an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

Embodiment 4

Figure 4:
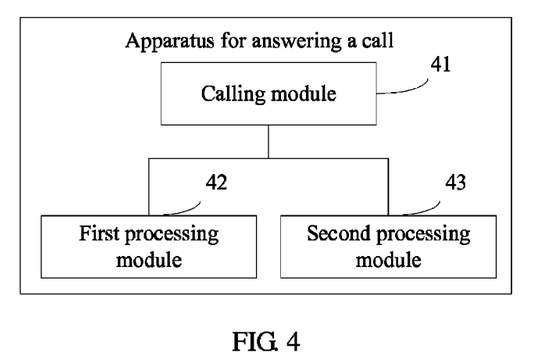
FIG. 4 is a schematic structural diagram of a first apparatus for answering a call according to Embodiment 4 of the present invention.

This embodiment provides an apparatus for answering a call. The apparatus is configured to perform the method for answering a call provided by the foregoing Embodiment 1, Embodiment 2, or Embodiment 3. As shown in FIG. 4, the apparatus includes a calling module 41, configured to, after a call is received from a calling party, answer the call by using an automatic call answering function of a terminal, and talk with the calling party. The apparatus further includes a first processing module 42, configured to, if an instruction is received from an owner in the process of talking performed by the calling module 41 with the calling party, perform an operation according to the instruction of the owner. The apparatus also includes a second processing module 43, configured to, if no instruction is received from an owner in the process of talking performed by the calling module 41 with the calling party, enable a recording, determine an emergency level of the call according to call content, and perform an operation according to the determined emergency level.

Figure 5:
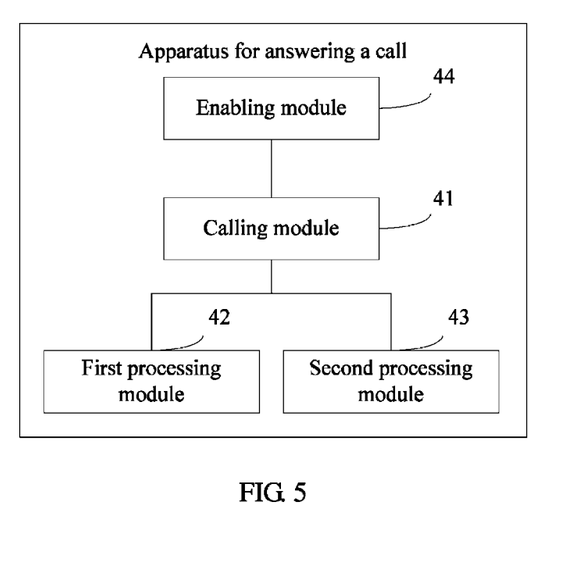
FIG. 5 is a schematic structural diagram of a second apparatus for answering a call according to Embodiment 4 of the present invention.

Further, as shown in FIG. 5, the apparatus further includes an enabling module 44, configured to receive information, determine whether the received information includes preset information for enabling the automatic call answering function or detect whether the received information includes an instruction for enabling the automatic call answering function, and if yes, enable the automatic call answering function of the terminal. Or the enabling module 44 is configured to determine whether a call of a preset number used to trigger enabling of the automatic call answering function is received and whether the call exceeds preset duration. If yes, the automatic call answering function of the terminal is enabled.

Figure 6:
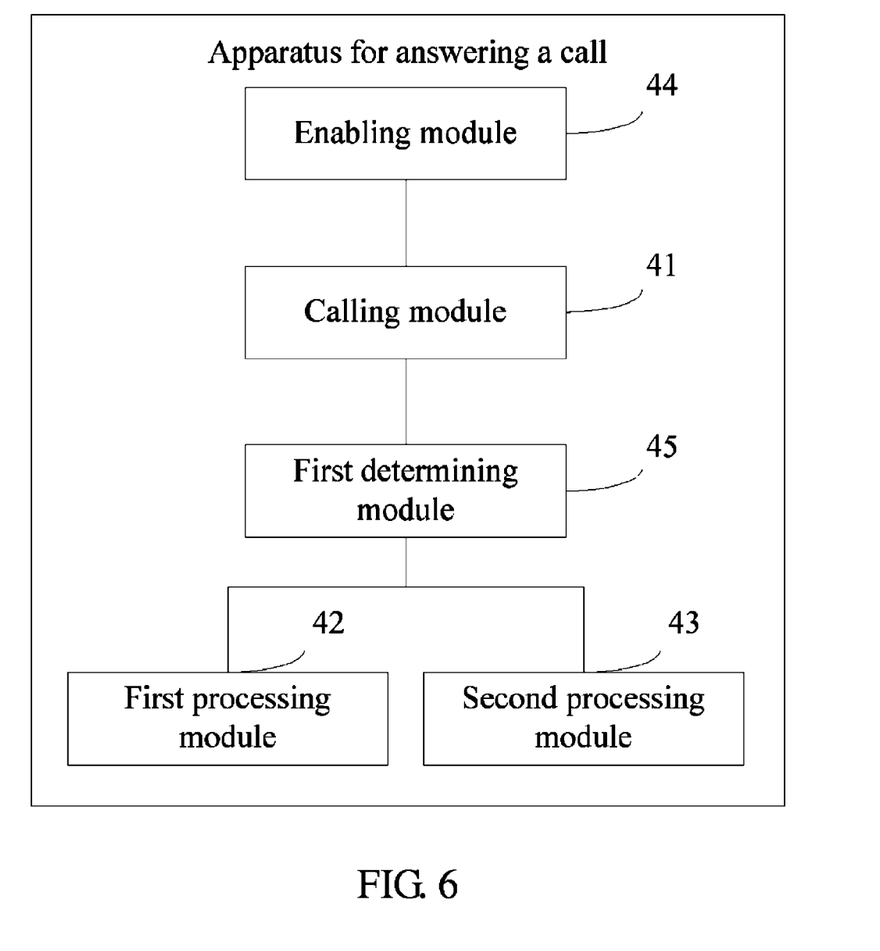
FIG. 6 is a schematic structural diagram of a third apparatus for answering a call according to Embodiment 4 of the present invention.

Further, as shown in FIG. 6, the apparatus further includes a first determining module 45, configured to determine, in the process of talking performed by the calling module 41 with the calling party, whether a parameter setting instruction sent by the owner is received.

Correspondingly, the first processing module 42 is specifically configured to, if the first determining module 45 determines that the parameter setting instruction sent by the owner is received, set a parameter of the automatic call answering function according to the parameter setting instruction sent by the owner, where the parameter for setting the automatic call answering function includes a parameter for setting a filtering manner, a parameter for setting modes of an earpiece and a headset during the answering, a parameter for setting whether to notify the owner, or a parameter for setting whether to play a recording for the owner.

Figure 7:
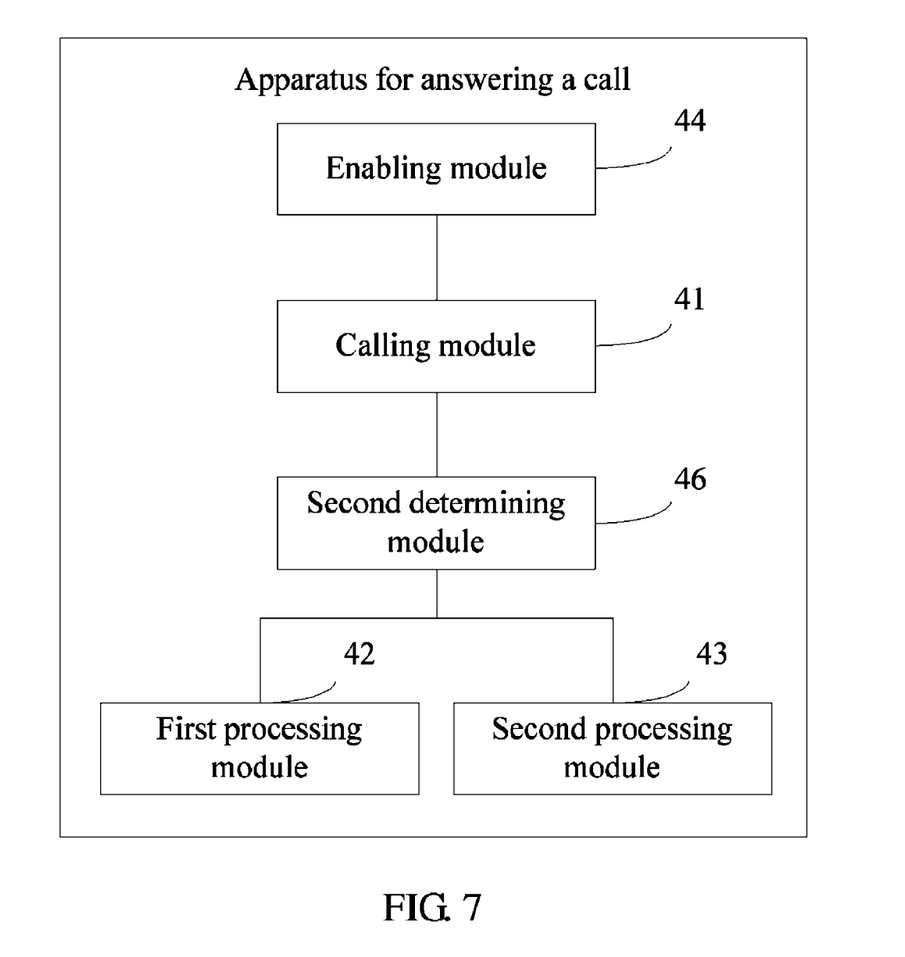
FIG. 7 is a schematic structural diagram of a fourth apparatus for answering a call according to Embodiment 4 of the present invention.

Optionally, as shown in FIG. 7, the apparatus further includes a second determining module 46, configured to determine, in the process of talking performed by the calling module 41 with the calling party, whether a call answering instruction sent by the owner is received.

Correspondingly, the first processing module 42 is specifically configured to, if the second determining module 46 determines that the call answering instruction sent by the owner is received, quit talking with the calling party according to the call answering instruction sent by the owner, and the owner talks with the calling party.

Further, the second processing module 43 is specifically configured to, if the determined emergency level is urgency, establish a connection with the owner; or, if the determined emergency level is non-urgency, excerpt a call keyword, and determine, according to a setting, whether to notify the owner. If yes, the owner is notified according to a set notification manner.

Further, the second processing module 43 is specifically configured to, if a current mode is a phone forgetting mode, notify the owner by using a manner of sending an SMS message to the owner, sending a mail to the owner, calling the owner, or sending an IM message to the owner. If a current mode is a conference mode, the owner is notified by using a manner of vibration, lighting, or screen lighting.

According to the apparatus provided by this embodiment, after a call is answered by using an automatic call answering function of a terminal, talking with a calling party is performed. If no instruction is received from an owner in the process of talking with the calling party, an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

Embodiment 5

This embodiment provides a terminal for answering a call, where the terminal includes an apparatus for answering a call.

The apparatus for answering a call is the apparatus for answering a call provided by the foregoing Embodiment 4. For specific details, reference is made to the foregoing Embodiment 4.

According to the terminal provided by this embodiment, after a call is answered by using an automatic call answering function of the terminal, an apparatus for answering a call talks with a calling party. If no instruction is received from an owner in the process of talking with the calling party, an operation can be performed according to a determined emergency level, so that a user does not need to afford additional fees and can avoid missing an important call, thereby bringing convenience for the user. In addition, after an instruction is received from an owner in the process of talking with the calling party, an operation is performed according to the instruction of the owner, so that remote control processing can be implemented for the call in a case where the user cannot answer the call or it is inconvenient for the user to answer the call.

It should be noted that when the apparatus for answering a call provided by the foregoing embodiment answers a call, division of each of the foregoing functional modules is merely described as an example. In an actual application, the foregoing function allocation may be completed by different functional modules according to a requirement, that is, the internal structure of the apparatus is divided into different functional modules to implement all or some of the foregoing functions. In addition, the apparatus for answering a call, the terminal for answering a call, and the method embodiments for answering a call provided by the foregoing embodiments belong to a same idea. For a specific implementation procedure, reference is made to the method embodiments. Details are not described herein again.

The foregoing sequence numbers provided in the embodiments of the present invention are used for description only, but do not represent superiority or inferiority of the embodiments.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for answering a call, comprising:
   after a call is received from a calling party, answering the call by using an automatic call answering function of a terminal;
   communicating, by the terminal, with the calling party;
   determining, while communicating with the calling party, if an instruction of an owner was received over a communications network by the terminal prior to the call being received;
   determining, after answering the call and while communicating with the calling party, that a call answering instruction sent by the owner is received;
   when a determination is made that the instruction was received over a communications network by the terminal prior to the call being received, performing an operation according to the instruction of the owner, the performing the operation according to the instruction of the owner comprising quitting communicating with the calling party according to the call answering instruction sent by the owner and in response to determining that the call answering instruction has been received; and
   when a determination is made that the instruction is not received, determining an emergency level of the call according to call content and performing an operation according to the determined emergency level.

2. The method according to claim 1, wherein, before answering the call, the method further comprises:
   receiving information;
   determining whether the received information comprises preset information or an instruction for enabling the automatic call answering function; and enabling the automatic call answering function of the terminal in response to a determination that the received information comprises the preset information or the instruction for enabling the automatic call answering function.

3. The method according to claim 1, wherein, before answering the call, the method further comprises
determining whether a call from a preset number used to trigger enabling of the automatic call answering function is received;
determining whether the call from the preset number exceeds a preset duration; and
enabling the automatic call answering function of the terminal in response to a determination that the call of the preset number is received and exceeds the preset duration.

4. The method according to claim 1, wherein, after answering the call, the method further comprises determining, while communicating with the calling party, that a parameter setting instruction sent by the owner is received; and
wherein, in response to determining that the parameter setting instruction has been received, performing the operation according to the instruction of the owner comprises setting a parameter of the automatic call answering function according to the parameter setting instruction sent by the owner, wherein the parameter comprises a parameter for setting a filtering manner, a parameter for setting modes of an earpiece and a headset during the answering, a parameter for setting whether to notify the owner, or a parameter for setting whether to play a recording for the owner.

5. The method according to claim 1, wherein performing the operation according to the determined emergency level comprises:
when the determined emergency level is urgency, establishing a connection with the owner; and
when the determined emergency level is non-urgency, excerpting a call keyword, and determining, according to a setting, whether to notify the owner, wherein, in response to a determination to notify the owner, notifying the owner according to a set notification manner.

6. The method according to claim 5, wherein notifying the owner according to the set notification manner comprises:
when a current mode is a phone forgetting mode, notifying the owner by using a manner of sending an SMS message to the owner, sending an electronic mail to the owner, calling the owner, or sending an instant messaging (IM) message to the owner; and
when the current mode is a conference mode, notifying the owner by using a manner of vibration, lighting, or screen lighting.

7. An apparatus for answering a call, comprising:
a processor; and
a computer-readable storage medium storing a program to be executed by the processor, the program including instructions for:
after a call is received from a calling party, answering the call by using an automatic call answering function of a terminal;
communicating, by the terminal, with the calling party;
performing, while communicating with the calling party, and in response to an instruction being received by the terminal from an owner over a communications network prior to the call being received, an operation according to the instruction of the owner;
determining, while communicating with the calling party, whether a call answering instruction sent by the owner is received;
quitting, in response to determining that the call answering instruction has been received, communicating with the calling party according to the call answering instruction sent by the owner; and
determining, in response to no instruction being received, an emergency level of the call according to call content, and performing an operation according to the determined emergency level.

8. The apparatus according to claim 7, wherein the program further includes instructions for:
receiving information; and
determining whether the received information comprises preset information or an instruction for enabling the automatic call answering function; and
enabling the automatic call answering function of the terminal in response to a determination that the received information comprises the preset information or the instruction for enabling the automatic call answering function.

9. The apparatus according to claim 7, wherein the program further includes instructions for:
determining whether a call from a preset number used to trigger enabling of the automatic call answering function is received;
determining whether the call of the preset number exceeds a preset duration; and
enabling the automatic call answering function of the terminal in response to a determination that the call from the preset number is received and exceeds the preset duration.

10. The apparatus according to claim 7, wherein the program further includes instructions for determining, while communicating with the calling party, whether a parameter setting instruction sent by the owner is received, wherein, in response to determining that the parameter setting instruction has been received, setting a parameter of the automatic call answering function according to the parameter setting instruction sent by the owner, wherein the parameter comprises a parameter for setting a filtering manner, a parameter for setting modes of an earpiece and a headset during the answering, a parameter for setting whether to notify the owner, or a parameter for setting whether to play a recording for the owner.

11. The apparatus according to claim 7, wherein the program further includes instructions for:
when the determined emergency level is urgency, establishing a connection with the owner; and
when the determined emergency level is non-urgency, excerpting a call keyword, and determining, according to a setting, whether to notify the owner, wherein, in response to a determination to notify the owner, notifying the owner according to a set notification manner.

12. The apparatus according to claim 11, wherein the program further includes instructions for:
when a current mode is a phone forgetting mode, notifying the owner by using a manner of sending an SMS message to the owner, sending an electronic mail to the owner, calling the owner, or sending an instant messaging (IM) message to the owner; and
when the current mode is a conference mode, notifying the owner by using a manner of vibration, lighting, or screen lighting.

13. A terminal comprising the apparatus for answering a call according to claim 7.

\* \* \* \* \*